US008891939B2

(12) United States Patent  (10) Patent No.: US 8,891,939 B2
Alexandrov et al.  (45) Date of Patent: Nov. 18, 2014

(54) SYSTEMS AND METHODS FOR VIDEO-AWARE SCREEN CAPTURE AND COMPRESSION

(75) Inventors: Albert Alexandrov, Goleta, CA (US); Bernd Oliver Christiansen, Santa Barbara, CA (US); Brian Green, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 977 days.

(21) Appl. No.: 12/644,912

(22) Filed: Dec. 22, 2009

(65) Prior Publication Data

US 2011/0150433 A1  Jun. 23, 2011

(51) Int. Cl.
| | |
|---|---|
| H04N 9/80 | (2006.01) |
| H04N 5/92 | (2006.01) |
| G06F 3/00 | (2006.01) |
| G06F 3/048 | (2013.01) |
| H04N 7/15 | (2006.01) |
| H04N 19/12 | (2014.01) |
| H04N 5/91 | (2006.01) |
| H04N 19/503 | (2014.01) |
| H04N 19/17 | (2014.01) |
| H04N 5/765 | (2006.01) |
| H04N 9/79 | (2006.01) |
| H04N 9/82 | (2006.01) |

(52) U.S. Cl.
CPC ............. *H04N 19/0026* (2013.01); *H04N 7/15* (2013.01); *H04N 5/765* (2013.01); *H04N 19/00078* (2013.01); *H04N 5/91* (2013.01); *H04N 19/00575* (2013.01); *H04N 9/7921* (2013.01); *H04N 9/8205* (2013.01)
USPC ........... 386/248; 386/239; 386/326; 715/716; 715/778

(58) Field of Classification Search
None
See application file for complete search history.

(56) References Cited

U.S. PATENT DOCUMENTS

| | | |
|---|---|---|
| 5,553,083 A | 9/1996 | Miller |
| 5,727,002 A | 3/1998 | Miller |

(Continued)

FOREIGN PATENT DOCUMENTS

WO  WO 2008137432 A2  11/2008

OTHER PUBLICATIONS

International Search Report dated Jun. 4, 2012 from Corresponding PCT Application No. PCT/US2010/061009.

(Continued)

*Primary Examiner* — Heather Jones
(74) *Attorney, Agent, or Firm* — BainwoodHuang (57) ABSTRACT

A new approach is proposed that contemplates systems and methods to support video-aware screen capture and compression. More specifically, the video-aware approach first detects whether or when video content is being actively played back on a screen of a hosting device. If the video content is actively being rendered, the approach separates (segments) the screen content into static (non-video) content and video content, The approach then applies video-specific capture and compression methods to the video content of the screen and other suitable compression methods to the non-video content of the screen. The compressed static and video content of the screen are separately and independently transmitted across the network to remote computing devices and are then decompressed and processed to reconstruct screen of its original content for display at the screens of the remote computing devices.

47 Claims, 3 Drawing Sheets

(56) References Cited

U.S. PATENT DOCUMENTS

| | | | |
|---|---|---|---|
| 5,764,235 | A | 6/1998 | Hunt et al. |
| 5,826,025 | A | 10/1998 | Gramlich |
| 5,845,265 | A | 12/1998 | Woolston |
| 5,956,027 | A | 9/1999 | Krishnamurthy |
| 6,081,829 | A | 6/2000 | Sidana |
| 6,167,432 | A | 12/2000 | Jiang |
| 6,246,758 | B1 | 6/2001 | Low |
| 6,249,291 | B1 | 6/2001 | Popp et al. |
| 6,343,313 | B1 | 1/2002 | Salesky et al. |
| 7,013,327 | B1 | 3/2006 | Hickman et al. |
| 7,197,535 | B2 | 3/2007 | Salesky et al. |
| 7,310,675 | B2 | 12/2007 | Salesky et al. |
| 7,369,515 | B2 | 5/2008 | Salesky et al. |
| 7,418,476 | B2 | 8/2008 | Salesky et al. |
| 7,426,191 | B2 | 9/2008 | Salesky et al. |
| 7,593,987 | B2 | 9/2009 | Salesky et al. |
| 7,627,663 | B2 | 12/2009 | Salesky et al. |
| 7,715,331 | B2 | 5/2010 | Salesky et al. |
| 7,716,344 | B2 | 5/2010 | Salesky et al. |
| 7,813,304 | B2 | 10/2010 | Salesky et al. |
| 7,822,859 | B2 | 10/2010 | Salesky et al. |
| 7,836,163 | B2 | 11/2010 | Salesky et al. |
| 7,877,489 | B2 | 1/2011 | Salesky et al. |
| 7,934,002 | B2 | 4/2011 | Salesky et al. |
| 2002/0112004 | A1 | 8/2002 | Reid et al. |
| 2003/0140159 | A1 | 7/2003 | Campbell |
| 2005/0198189 | A1 | 9/2005 | Robinson et al. |
| 2005/0246634 | A1* | 11/2005 | Ortwein et al. ............... 715/530 |
| 2006/0010392 | A1 | 1/2006 | Noel et al. |
| 2006/0069797 | A1 | 3/2006 | Abdo et al. |
| 2007/0041366 | A1 | 2/2007 | Vugenfirer et al. |
| 2008/0002894 | A1 | 1/2008 | Hayon et al. |
| 2010/0111410 | A1* | 5/2010 | Lu et al. ......................... 382/166 |
| 2010/0138775 | A1* | 6/2010 | Kohen et al. ................... 715/781 |
| 2010/0279266 | A1 | 11/2010 | Laine et al. |
| 2010/0306674 | A1 | 12/2010 | Salesky et al. |

OTHER PUBLICATIONS

The Written Opinion dated Jun. 4, 2012 from Corresponding PCT Application No. PCT/US2010/061009.

U.S. Appl. No. 09/523,315, filed Mar. 10, 2000, Salesky.

U.S. Appl. No. 60/014,242, filed Mar. 26, 1996, Salesky.

US 5,715,404, 02/1998, Katseff et al. (withdrawn).

"CU-SeeMe Software Product," Brought to you by the Cu-SeeMe Development Team of the Advanced Technologies and Planning group of the Network Resources Division of Cornell Information Technologies, pp. 1-8 (1995).

"ORCA Video Conferencing System", Manual Written by the National Oceanic and Atmospheric Administration's Office of Ocean Resources Conservation and Assessment for Operation of the CU-SeeMe System, 26 pages (1995).

Abdel-Wahab et al., "XTV: A Framework for Sharing X Window Clients in Remote Synchronous Collaboration," IEEE Conference, pp. 1-15 (1991).

Chen et al., "Real Time Video and Audio in the World Wide Web", 1995.

Bolot et al., "Scalable Feedback Control for Multicast Video Distribution in the Internet," SIGCOMM 94, London England, pp. 58-67 (1994).

Cox, "Global Schoolhouse Project," http://www.virtualschool.edu/mon/academia (Retrieved 2010).

Crowley et al., "MMConf: An Infrastructure for Building Shared Multimedia Applications," Proceedings of the 1990 ACM Conference on Computer—Supported Cooperative Work, pp. 329-342 (1990).

Delgrossi et al., "Media Scaling for Audiovisual Communication with the Heidelberg Transport System," Conference Proceedings of the first ACM International Conference on Multimedia, pp. pp. 99-104 (1993).

Dorcey, "CU-SeeMe Desktop Videoconferencing Software," Connexions The Interoperability Report, 9: 42-45 (1995).

Ensor et al., "Control Issues in Multimedia Conferencing," IEEE Conference, pp. 133-143 (1991).

Ensor et al., "The Rapport Multimedia Conferencing System—A Software Overview," Proceedings of the 2nd IEEE Conference, pp. 52-58 (1988).

Maly et al., "Mosaic + XTV = CoReview," Computer Networks and ISDN Systems, pp. 1-19 1995.

McCanne et al., "Receiver-Driven Layered Multicast," ACM SIGCOMM, pp. 1-14 (1996).

Sattler, "Internet TV with CU-SeeMe", Book, 323 pages (1995).

Savetz et al., "MBONE: Multicasting Tomorrow's Internet," IDG Books Worldwide, Inc., (1996).

* cited by examiner

SYSTEMS AND METHODS FOR VIDEO-AWARE SCREEN CAPTURE AND COMPRESSION

BACKGROUND

Screensharing is a technique that enables one hosting computing device, which for a non-limiting example, can be a associated with a presenter at a conference call, to share content rendered on its screen, either synchronously or a synchronously, with one or more other computing devices located remotely over a communication network, which for a non-limiting example, can be associated with one or more viewers/listeners at the conference call. For the hosting computing device, screensharing implementations typically include capture of the rendered content on the screen, compression of the captured screen content for transmission, and transmission of the compressed screen content to the computing devices of the remote computing devices over the network. For each of the remote computing devices, screensharing implementations typically include receiving the compressed screen content, decompression, and display of the screen content on a display of the remote computing device.

Typically the shared screen content can be but is not limited to applications running on the computing device, such as MS Word, PowerPoint, and web browsers, etc. This type of content may contain one or more of textual images (such as simple text) and static images (such as solid background and continuous-tone images) and is referred to here in as "non-video content" to be distinguished from "video content". Non-video content does change and can change frequently (although may not be as frequently as video content), but unlike video content, non-video content contains fine details (e.g., text and icons) that need to be preserved at the highest possible image quality in order to be reproduced very accurately on the screens of the remote computing devices.

Increasingly, the content rendered on the screen can be multimedia in nature, and video content (such as a video clip, an animation or simulation application) is becoming more important since computers and the Internet have become fast enough to make video content a frequently used type of content. As a result, there is an increasing need to be able to share video content in addition to the traditional non-video content. Existing screen capture and compression techniques are optimized and very well suited for non-video content, which requires high fidelity but low frequency and irregular updates. Unlike the textual and static images, however, video content rendered on the screen is dynamic in nature and changes constantly over time. Consequently, the video content on the screen needs to be captured and compressed at high regular frame/screenshot rate while pixel-accuracy less important. While the non-video content optimized capture and compression approaches can certainly encode the video content, they are typically very inefficient at it. For a non-limiting example, existing static-content optimized capture approaches may only be able to reproduce low frequency, e.g., 1-3 frames/screenshots per second (fps), over a communication link 1 M bit/second in bandwidth since they strive to maximize image fidelity at the expense of update frequency. If applied to video content that need to be captured at a high frequency. e.g., at 30 fps, for real time transmission since, such approaches would result in high bitrates (e.g., 10M bits/second) of compressed data, placing a prohibitively heavy burden on the processing capacity of the computer device performing the compression, and the bandwidth of the communication network transmitting the compressed data. For another non-limiting example, existing image compression approaches such as JPEG and PNG and especially sophisticated derivatives that combine the two make them very good choices for high fidelity compression of the non-video content but not fast compression of the video content. Video compression via a video codec such as H.264, on the other hand, is capable of compressing the video content 10 or more times efficient than an image compression approach, but is not suitable for compression of the non-video content since that would result in unacceptable image quality. For a non-limiting example, 8 point text on a 1600×1200 screen would be unreadable.

One way to transmit and share the video content rendered on the screen is to transmit/stream it as a video file separate from the rest of content on the screen. For a non-limiting example, a file of the video content may be first uploaded by a sender to a central storage location, and then downloaded to and played back at computing devices of the intended viewers in synchronization with the rest of the screenshot shared with the viewers. This approach, however, only works if the sender has control of the video file or has it prepared ahead of time before sharing it with others and the computing devices of the sender and the viewers must have various kinds of video codecs pre-installed in order to support the playback of the video file. The approach does not work when no file for the video content to be shared is readily available, for non-limiting examples, when a video is embedded in a PowerPoint presentation or played inside a webpage like a YouTube® video, or any Adobe Flash® video/animation/simulation.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support video-aware screen capture and compression. More specifically, the video-aware approach first detects whether or when video content is being actively played back on a screen of a hosting device. If the video content is actively being rendered, the approach separates (segments) the screen content into static (non-video) content and video content, The approach then applies video-specific capture and compression methods to the video content of the screen and other suitable compression methods to the non-video content of the screen. The compressed static and video content of the screen are separately and independently transmitted across the network to remote computing devices and are then decompressed and processed to reconstruct the screen with its original content for display at the screens of the remote computing devices. By segmenting the screen content into static and video content and by using separate capture and compression techniques optimized for video and non-video content respectively, this approach combines the benefits of video-specific and non-video specific techniques and can automatically handle any screen content. By detecting the video content being played on the screen and applying video compressions to the such content, the approach may greatly improve compression ratio and reduce the bitrates of the compressed data to be transmitted, e.g., from 10M bits/s (if non-video compression is used) to 400K bits/s without compromising the human-perceived quality of the video content, thus enabling the computing devices and the communication network to handle real time transmission of the video content at 30 frames/s (instead of only 2 frames/s) under the same capacity and bandwidth. Conversely, the approach maintains high fidelity required for text/image by using non-video-specific (instead of video-specific) compression techniques on non-video content.

Figure 1:
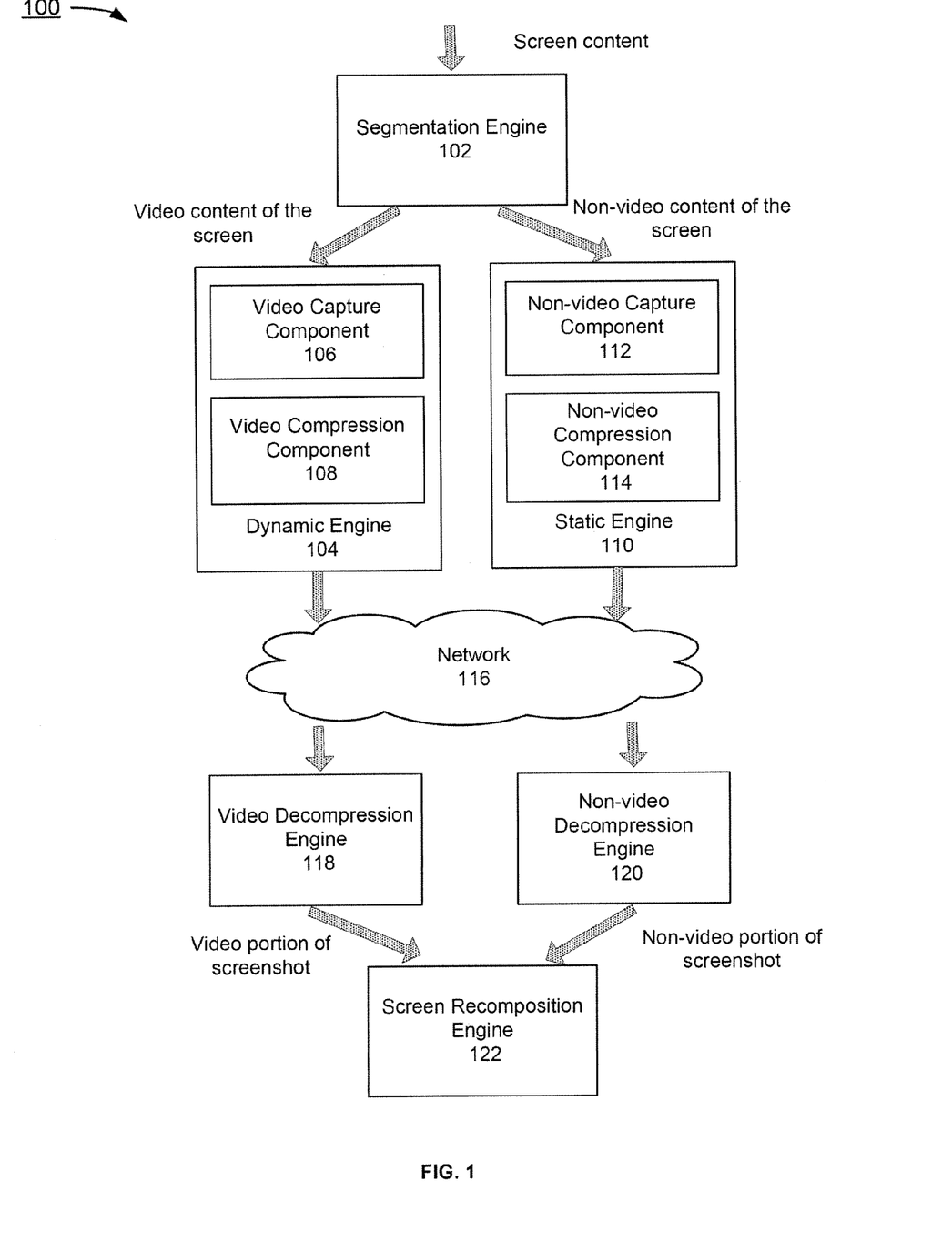
FIG. 1 depicts an example of a diagram of system to support video-aware compression for multimedia screen capture and compression.

FIG. 1 depicts an example of a diagram of system to support video-aware compression for multimedia screen capture and compression. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more computing devices (not shown), each operable to run at least one or more of a segmentation engine 102, a dynamic engine 104 that further comprises at least a video capture component 106 and a video compression component 108, and a non-video content engine 110 that further comprises at least a non-video capture component 112 and a non-video compression component 114. The system 100 may further include a communication network 116, and one or more remote computing devices (not shown), each operable to run at least one or more of a video decompression engine 118, a non-video decompression engines 120, and a screen recomposition engine 122.

As used herein, the term "engine" or "component" refers to a software, firmware, hardware, or other component that is used to effectuate a purpose. The engine or component will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the hosts/hosting devices/ computing devices running the engines and the components can be a computing device, a communication device, a storage device, or any electronic device capable of running a software component. For non-limiting examples, a computing device can be but is not limited to, a laptop PC, a netbook PC, a desktop PC, a tablet PC, an iPod, an iPhone, a PDA, or a server machine. A storage device can be but is not limited to a hard disk drive, a flash memory drive, or any portable storage device. A communication device can be but is not limited to a mobile phone or a smartphone.

Figure 2:
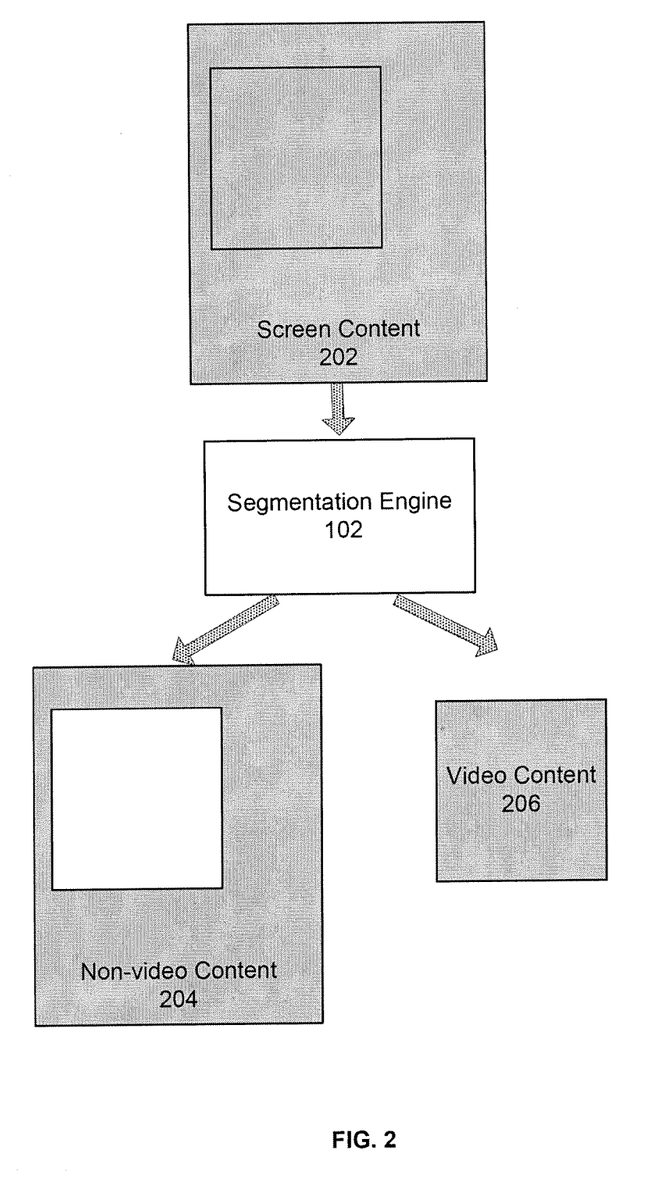
FIG. 2 depicts an example of segmentation of a screen content into non-video content and video content.

In the example of FIG. 1, the segmentation engine 102 is operable to detect/identify whether video content is being actively played back and rendered on a screen of the computing device and, as shown in the example of FIG. 2, separates the screen content 202 into regions of non-video content 204 and video content 206 before capture and compression of the screen content. Here, the video content refers to any dynamic content that resembles video, e.g., changes over time at regular intervals, which includes but is not limited to, a video clip, an Adobe Flash® animation or video, a video game, or a simulation application. Here, segmentation of static and video content is done not only for the purpose that compression can be optimized for static and video content respectively, but also for the optimization of screen capture. For a non-limiting example, screen capture can be done at 30 fps for the region of video content and at 3 fps for the region of non-video content (or even at irregular intervals triggered by events such as key presses or mouse movement).

In some embodiments, the segmentation engine 102 enables a user to manually select the regions of static and/or video content on the screen by interactively marking, outlining, pointing to, or clicking on the respective regions of the screen content. For a non-limiting example, the segmentation engine 102 enables the user to identify where on the screen the video content is being rendered by pointing to, e.g., the lower left coordinates of an application window rendering the video content, as well as the size of the application window through which the video content is being rendered. Alternatively or in combination with manual selection, the segmentation engine 102 performs automatic video detection to identify the regions of video and/or non-video content on the screen, including a sub-region of non-video content inside a region of video content or vise versa as discussed in details below.

In some embodiments, the segmentation engine 102 identifies not only whether there is video content being rendered on the screen, but also the current active status of the video content as to whether such video content is being actively played or not. For a non-limiting example, a presenter may pause the playback of a video clip to illustrate a point or make some comments. The information on the active status of the video content will enable the segmentation engine 102 to make a "smart" decision on whether or not treat the paused video as video content or as non-video content, and paused video content would look better if compressed using the static compression approaches.

In some embodiments, the segmentation engine 102 detects the video content being rendered on the screen by identifying a specific application window of video-oriented application that is running on the host. Such video-oriented applications include but are not limited to, Windows® Media Player, QuickTime®, RealPlayer® and Adobe Flash®. In addition, the segmentation engine 102 may also look for a running Web browser, such as Internet Explorer or Firefox, and identify the website/web page the browser is currently browsing at the moment by inspecting the URL and/or page title of the website/webpage. The segmentation engine 102 may then determine whether the website/webpage is rendering video content embedded in the browser by comparing the URL of the website (such as www.youtube.com or video.yahoo.com) to a lookup table that includes a set of known video-oriented websites, and/or extracting and matching keywords in the title of the webpage (such as "video clips") to a set of video-oriented sensitive words.

In some embodiments, the segmentation engine 102 detects video content being rendered by constantly monitoring the screen for changes and looking for regions whose change pattern resembles video. Since the video content may change dynamically, the segmentation engine 102 needs to capture and monitor the content rendered on the screen at a high frequency by taking screenshots at, for a non-limiting example, 30 frames per second. The segmentation engine 102 then looks for areas on the screen whose content changes frequently, e.g., more than 5 times/second monitored over a certain period of time (e.g., at least one second), at the pixel level of the screenshots taken. Here, an area can be rectangle in shape, and content within the area is deemed as having changed if over a predetermined threshold, e.g., 75% or more of the pixels within that rectangle area between two consecutive screenshots are different. The segmentation engine 102 further reduces false positive video content detection by preventing pixel changes caused by normal user activities, such as scrolling the contents within a window, from being treated as video content. Since the video content may be rendered on the screen in different shapes and sizes, the segmentation engine 102 may choose the area of the screen to monitor based on a set of heuristics. For non-limiting examples, for comprehensive screen content monitoring, the segmentation engine 102 may pick a set of rectangle areas with sizes ranging from full screen size to the size of a Windows® Media Player or YouTube®, since most video contents are typically rendered in a rectangle area either expanded to full screen or limited within a media player. Other alternative shapes of the area such as a circled area may also be adopted for monitoring. Note that the area chosen for monitoring should be over a minimal size threshold in order to prevent small, frequently updated areas such as progress bars, graphical equalizers, animated icons (e.g., the IE spinning globe) from being treated as video content.

In some embodiments, the segmentation engine 102 automatically detects content that although is constantly changing, but should still be characterized as non-video content. Such content includes but is not limited to, progress bar, graphical equalizer, animated icon, and spinning logo as mentioned above. For a non-limiting example, although a progress bar of an application which is uploading or downloading video content may be constantly changing to show the progress of the uploading or downloading, the region of the application window itself should be regarded as non-video content since compressing it with a video codec would result in poor human-perceived quality of the progress bar and any text associated with it (such as elapsed/remaining time counters). Under such a scenario, the segmentation engine 102 may determine the exact location of the progress bar based on the specific application window (e.g., Windows® Media Player) it is associated with, and treat the progress bar as non-video content.

In some embodiments, the segmentation engine 102 detects the video content actively being rendered on a screen based on a combined approach of the identifying video-oriented application windows and monitoring changes of content rendered on a screen. First, the segmentation engine 102 identifies the video-oriented applications and web pages since identifying such applications and web pages are typically faster and take less time than screen content monitoring. When no video-oriented applications or web pages can be identified, for a non-limiting example, when video content is embedded in a MS PowerPoint presentation, the segmentation engine 102 then resorts to screen content monitoring to identify areas on the screen which content are constantly changing. Such combined approach balances between the efficiency (via fast application identification) and /thoroughness (via comprehensive content monitoring) of the video content detection. Such combined approach also increases the accuracy of detection of video content since it would reduce the number of false positives and false negatives compared to either of the two individual approaches.

In the example of FIG. 1, the dynamic engine 104 takes information on existence, location, size, and activity of video content on the screen, and then captures and processes screenshots of the video content rendered on the screen based on such information. If video content is detected as being actively played back on the screen by the segmentation engine 102, or if a paused video content is being started or resumed to be played back on the screen as detected by the segmentation engine 102, video capture component 106 of the dynamic engine 104 captures screenshots of the video content at a high frequency (e.g., at 30 frames/second) for real time transmission of the video content. In some embodiments, the video capture component 106 of the dynamic engine 104 may delay for several frames after the video content starts before starting to capture the video content in order to confirm that the video content is indeed being actively rendered on the screen. For each screenshot taken, the video capture component 106 provides the screenshots of the captured video content to the video compression component 108 for compression with its own compression approaches and parameters before the compressed data is being transmitted over communication network 122. Due to the fast-changing nature of the video content, frame rate (frequency) is more important than individual frame quality for the video compression component 108. In order to maximize human-perceived quality of the video content, the video compression component 108 may utilize a video codec, which performs high frame rate (e.g., 30 screenshots/second) but possibly lower quality/fidelity per individual screenshot (e.g., 20% of the original quality of the screenshot) compression on the screenshots of the fast-changing video content so that the remote viewers at the receiving end are able to see a continuously moving/changing video content without glitches, while the loads are acceptable on the computing devices running the video compression component 108 and on the bandwidth of network 122. Here, the video codec can be but is not limited to one of H.263, H.264, Motion JPEG, On2's VP6, VP7 and VP8.

In the example of FIG. 1, the static engine 110 takes information on existence, location, size, and activity of non-video content on the screen, and then captures and processes screenshots of the non-video content rendered on the screen based on such information. If no video content is detected or the video content is being paused or stopped, non-video capture component 112 of the static engine 110 captures screenshots of the non-video content at a low frequency to preserve high quality/fidelity of static images and texts, and each screenshot is provided to the non-video compression component 114 in its entirety, including the portion of video content being paused. The non-video compression component 114 compresses the screenshots of the non-video content with its own compression approaches and parameters, before the compressed data is being transmitted over communication network 122. Here, the non-video compression component 114 is a codec that can produce high quality (e.g., lossless or 80% of the original quality of the screenshot) compression on the screenshots of the static or slow-changing non-video content so that the remote viewers at the receiving end are able to see clear graphics and images with good resolution. Due to the static nature of the screenshots of the non-video content, compression quality is more important for the non video compression component 114, as the viewers may need to look at the still images over a prolonged period of time (e.g., seconds or minutes) in order to read text and/or appreciate details of the images clearly. Although the compressed data may be large in size compared to the compressed video content, the loads on the computing devices running the non-video compression component 114 and on the bandwidth of network 122 are acceptable as fewer screenshots need to be captured, compressed and transmitted.

In some embodiments, the static engine 110 may utilize multiple non-video compression components 114, each operable to process and compress a specific type of non-video content using its own compression approach and compression parameters, such as image resolution or color mapping, allowing for improved compression while reducing distortion visibility. For non-limiting examples, the background portion of the static images or text is suitable for continuous tone image compressors such as JPEG or JPEG-2000. The portion of the non-video content that contains many edges and continuous tone details can be compressed using a lossless data compression under bitmapped image format such as PNG instead of typical continuous tone compressors such as JPEG, GIF, TIFF, and BMP. Text objects and edges can be efficiently compressed using standard binary coders such as MMR, JBIG, JBIG-2, and PWC.

In the example of FIG. 1, the network 122 enables the video compression component 108 and the non-video compression component 114 to transmit the compressed screenshots of the video and non-video content of the screen over the communication network 122 to the corresponding video decompression engine 118 and the non-video decompression engine 120 for decompression. In some embodiments, the video compression component 108 and the non-video compression component 112 may further package the compressed screenshots of the video and the non-video content of the screen in a format, such as TIFF-FX or as an ITU-T data stream for transmission over the network 122. Here, the network 122 can be a communication network, based on certain communication protocols, such as TCP/IP protocol. Such a network can be but is not limited to, Internet, intranet, wide area network (WAN), local area network (LAN), wireless network, Bluetooth, WiFi, and mobile communication network. The physical connections of the network and the communication protocols are well known to those of skill in the art.

In the example of FIG. 1, the video decompression engine 118 and the non-video decompression engine 120 decompress the compressed screenshots of the video and non-video content of the screen received from the corresponding video compression component 108 and the non-video compression component 112, respectively. Here, the video compression component 108 and the video decompression engine 118 need agree a priori on the types of compressors and their associated parameters to be used for compressing the screenshots of the video content in order for the video decompression engine 118 to be able to decompress the compressed screenshots of the video content correctly with the corresponding types of decompressors with the same (compression/decompression) approaches and parameters. Similarly, agreement also needs to be reached between the non-video compression component 114 and the non-video decompression engine 120.

In the example of FIG. 1, the screen recomposition engine 122 processes the decompressed screenshots of the video and non-video content of the screen from the video decompression engine 118 and the non-video decompression engine 120, respectively, and further reconstructs a set of screenshots of the original content rendered on the screen of the hosting computing device for display on the remote computing device. More specifically, the screen recomposition engine 122 may copy both the decompressed screenshots of the video and the non-video content of the screen to their respective original positions on the screen based on information detected by the segmentation engine 102 in order to reconstruct the original content on the screen of the hosting computing device. Whenever a new screenshot of the video or the non-video content is received, the screen recomposition engine 122 will reconstruct a new screenshot by updating the corresponding portion of the previously reconstructed screenshot of the screen content. Since screenshots of the video content of the screen may be captured at a higher frequency than screenshots of the non-video content of the screen, the video portion of the reconstructed screenshots will be updated more frequently that the static portion. The screen recomposition engine 122 will then continuously provide the set of reconstructed screenshots of the original content for rendering on a screen of a remote computing device as such reconstructed screenshots are being generated.

While the system 100 depicted in FIG. 1 is in operation, the segmentation engine 102 detects whether video content is being actively played back and rendered on a screen of a hosting computing device. If the video content is detected, the segmentation engine 102 separates the video content from the rest of the non-video content of the screen, and provides the video and the non-video content to dynamic engine 104 and static engine 110, respectively. The video capture component 106 of the dynamic engine 104 then captures shots of the video content at a high frequency for real time transmission of the video content, while the non-video capture component 112 of the static engine 1110 captures the non-video content at a low frequency. Screenshots taken by the video capture component 106 and the non-video capture component 112 are provided to the video compression component 108 and the non-video compression component 114, respectively. The video compression component 108 and non-video compression component 114 then compresses the screenshots of the video and non-video content, respectively, at various compression speed and quality with their own compression approaches and parameters. The compressed screenshots of the video and the non-video content are then transmitted over communication network 122 to the corresponding video decompression engine 118 and the non-video decompression engine 120 for respective decompression. The screen recomposition engine 122 processes the decompressed screenshots of the video and non-video content of the screen to reconstruct a set of screenshots of the original content for rendering on a screen of the remote computing device.

Figure 3:
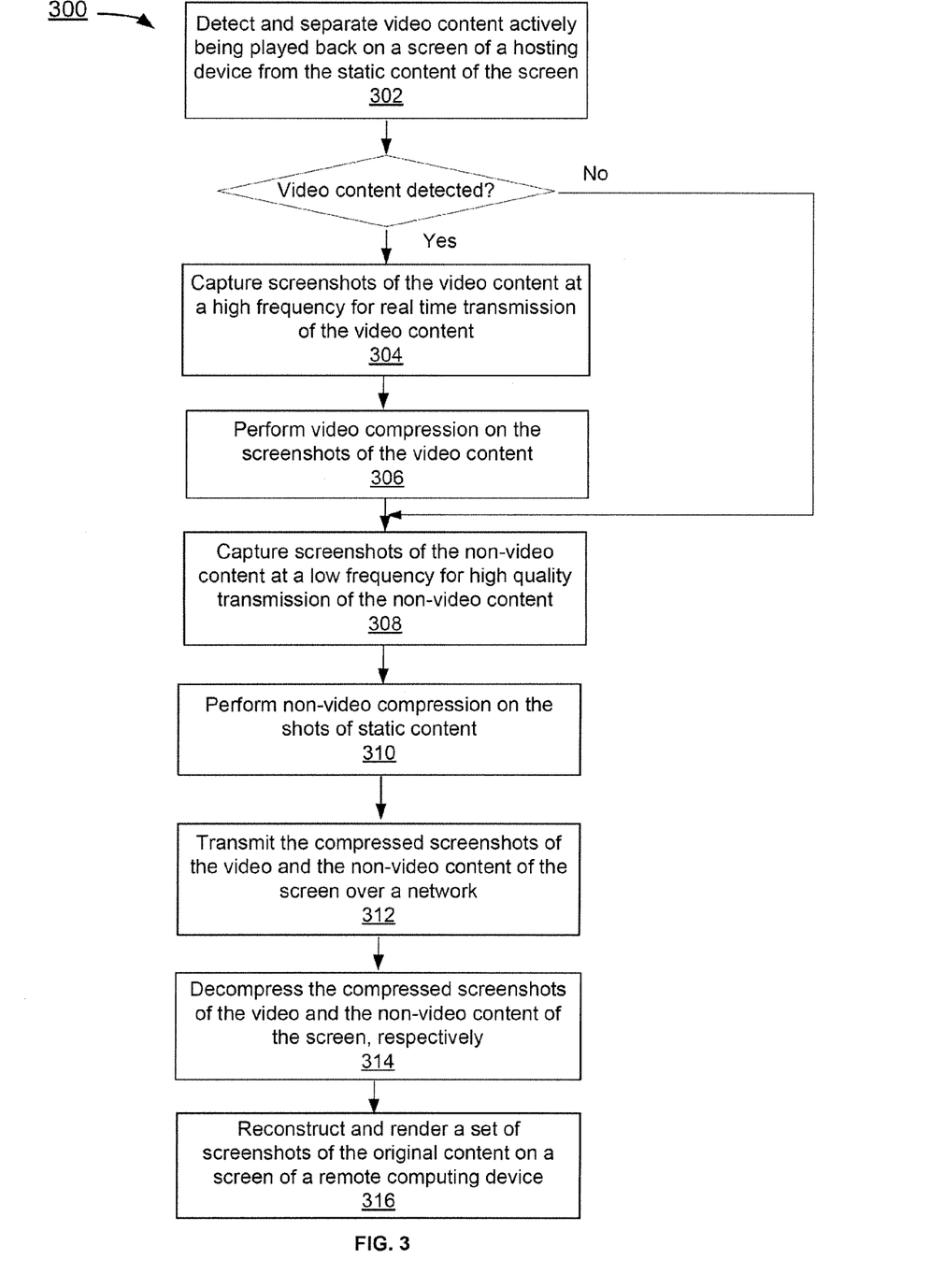
FIG. 3 depicts a flowchart of an example of a process to support video-aware compression for video-aware screen capture and compression in accordance with FIG. 1.

FIG. 3 depicts a flowchart of an example of a process to support video-aware compression for video-aware screen capture and compression in accordance with FIG. 1. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where video content actively being played back on a screen of a hosting device is detected and separated from the non-video content of the screen. As discussed above, the video content can be detected manually or automatically via video-oriented application identification or content change monitoring or a combination of both. If an actively rendered video content is detected, the flowchart 300 continues to block 304 where screenshots of the video content are captured at a high frequency to reflect the dynamic nature of the video content for real time transmission. The flowchart 300 continues to block 306 where video compression is performed on the screenshots of the video content. The flowchart 300 continues to block 308 where screenshots of the non-video content of the screen are captured at a low frequency for high quality transmission of the non-video content. The flowchart 300 then continues to block 310 where non-video compression is performed on the screenshots of the non-video content. The flowchart 300 continues to block 312 where both the compressed screenshots of the video and the non-video content of the screen are transmitted over a communication network. The flowchart 300 continues to block 314 where the compressed screenshots of the video and the non-video content of the screen are decompressed, respectively. The flowchart 300 ends at block 316 where a set of screenshots of the original content are reconstructed from the decompressed screenshots of the video and non-video content and rendered on a screen of a remote computing device.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

The invention claimed is:

1. A system, comprising:
a segmentation engine, which in operation, detects and separates video content being rendered on a screen of a hosting device from a non-video content rendered on the rest of the screen, wherein the video content comprises dynamic content that is being played back on the screen of the hosting device and changes over time at regular intervals, wherein the segmentation engine performs automatic video detection to identify the video content and the non-video content on the screen, the automatic video detection comprising: identifying at least one paused video content item, treating the at least one paused video content item as non-video content, identifying at least one content item that is changing at a rate of change associated with the video content but is non-video content, and treating the at least one content item that is changing at the rate of change associated with the video content as non-video content;
a dynamic engine, which in operation,
captures, at a video frame rate, a plurality of screenshots of the video content, and
performs video compression on each of the plurality of screenshots of the video content; and
a static engine, which in operation,
captures, at a non-video frame rate, a plurality of screenshots of the non-video content, wherein the video frame rate exceeds the non-video frame rate, and
performs non-video compression on each of the plurality of screenshots of the non-video content, wherein at least one of the video frame rate or the non-video frame rate comprises an irregular frame rate, and wherein the irregular frame rate is determined based on key presses or mouse movements.

2. The system of claim 1, further comprising:
a video decompression engine, which in operation, decompresses each of the compressed plurality of screenshots of the video content;
a non-video decompression engine, which in operation, decompresses each of the compressed plurality of screenshots of the non-video content.

3. The system of claim 2, further comprising:
a screen recomposition engine, which in operation,
reconstructs a set of screenshots of content of the screen of the hosting device from the decompressed screenshots of the video and the non-video content, respectively;
renders the set of screenshots of content of the screen of the hosting device on a screen associated with a remote computing device.

4. The system of claim 1, wherein:
the hosting device is a computing device, a communication device, a storage device, or any electronic device capable of running a software component.

5. The system of claim 1, wherein:
the video content includes one or more of a video clip, a Flash® application, an animation, or a simulation application.

6. The system of claim 1, wherein:
the non-video content includes text and image and other types of non-video content.

7. The system of claim 1, wherein:
the segmentation engine enables a user to manually select the regions of static and/or video content on the screen.

8. The system of claim 1, wherein:
the segmentation engine identifies location and size of an application window through which the video content is being rendered.

9. The system of claim 1, wherein:
the segmentation engine identifies whether the video content is being actively rendered or paused.

10. The system of claim 9, wherein:
the segmentation engine does not separate the video content from the rest of the screen content if the video content is paused.

11. The system of claim 1, wherein:
the segmentation engine detects the video content being rendered on the screen by identifying a specific application window of video-oriented application that is running on the host.

12. The system of claim 11, wherein:
the video-oriented application is one of Windows® Media Player, QuickTime®, RealPlayer®, Adobe Flash®, and a video embedded inside a web browser.

13. The system of claim 1, wherein:
the segmentation engine detects the video content being rendered on the screen by constantly monitoring the screen for changes in content and looking for an area of the screen whose content change pattern resembles video.

14. The system of claim 13, wherein:
the segmentation engine detects the video content being rendered on the screen by capturing a plurality of screenshots of the screen and monitoring changes in the area of the screen at the pixel level of the screenshots over a certain period of time.

15. The system of claim 14, wherein:
the segmentation engine determines changes in the area of the screen if pixels of the screenshots within the area change more than a predetermined threshold over the certain period of time.

16. The system of claim 1, wherein:
the segmentation engine detects content that although is constantly changing, but should still be characterized as non-video content.

17. The system of claim 1, wherein:
the segmentation engine detects the video content being rendered on the screen based on a combination of identifying a video-oriented application window and monitoring changes of content rendered on the screen for patterns resembling the video content.

18. The system of claim 1, wherein:
the dynamic engine captures the plurality of screenshots of the video content at a higher frequency than the static engine captures the plurality of screenshots of the non-video content.

19. The system of claim 1, wherein:
the dynamic engine delays for several frames after the video content starts before starting to capture the video content in order to confirm that the video content is indeed being actively rendered on the screen.

20. The system of claim 1, wherein:
the dynamic engine performs high frame rate but low quality/fidelity per individual screenshot compression on the screenshots of the video content.

21. The system of claim 1, wherein:
the video compression is one of H.263, H.264, Motion JPEG, On2's VP6, VP7 and VP8.

22. The system of claim 1, wherein:
the static engine performs low frame rate but high quality/fidelity per individual screenshot compression on the screenshots of the non-video content.

23. The system of claim 1, wherein:
the static engine performs multiple non video compression each operable to process and compress the screenshots of a specific type of non-video content.

24. The system of claim 1, wherein:
the non-video compression is one or a combination of PNG, GIF, BMP, JPEG, and TIFF.

25. The system of claim 1, wherein:
the dynamic engine and/or the static engine each packages the compressed screenshots of the video and/or the non-video content of the screen in a format for transmission over a communication network.

26. The system of claim 1, wherein the at least one content item that is changing at the rate of change associated with the video content comprises a progress bar, a graphical equalizer, an animated icon, or a spinning logo.

27. A computer-implemented method, comprising:
detecting and separating video content being rendered on a screen associated with a hosting device from a non-video content of the screen by performing automatic video detection to identify the video content and the non-video content on the screen, wherein the video content comprises dynamic content that is being played back on the screen of the hosting device and changes over time at regular intervals, the automatic video detection comprising: identifying at least one paused video content item, treating the at least one paused video content item as non-video content, identifying at least one content item that is changing at a rate of change associated with the video content but is non-video content, and treating the at least one content item that is changing at the rate of change associated with the video content as non-video content;
capturing, at a video frame rate, a plurality of screenshots of the video content;
performing video compression on each of the plurality of screenshots of the video content;
capturing, at a non-video frame rate, a plurality of screenshots of the non-video content, wherein the video frame rate exceeds the non-video frame rate; and
performing non-video compression on each of the plurality of screenshots of the non-video content, wherein at least one of the video frame rate or the non-video frame rate comprises an irregular frame rate, and wherein the irregular frame rate is determined based on key presses or mouse movements.

28. The method of claim 27, further comprising:
decompressing each of the compressed plurality of screenshots of the video content;
decompressing each of the compressed plurality of screenshots of the non-video content.

29. The method of claim 28, further comprising:
reconstructing a set of screenshots of content of the screen of the hosting device from the decompressed screenshots of the video and the non-video content, respectively;
rendering the set of screenshots of content of the screen of the hosting device on a screen associated with a remote computing device.

30. The method of claim 27, further comprising:
enabling a user to manually select the regions of static and/or video content on the screen.

31. The method of claim 27, further comprising:
identifying location and size of an application window through which the video content is being rendered.

32. The method of claim 27, further comprising:
identifying whether the video content is being actively rendered or paused.

33. The method of claim 32, further comprising:
not separating the video content from the rest of the screen content if the video content is paused.

34. The method of claim 27, further comprising:
detecting the video content being rendered on the screen by identifying a specific application window of video-oriented application that is running on a host.

35. The method of claim 27, further comprising:
detecting the video content being rendered on the screen by constantly monitoring the screen for changes in content and looking for an area of the screen whose content change pattern resembles video.

36. The method of claim 35, further comprising:
detecting the video content being rendered on the screen by capturing a plurality of screenshots of the screen and monitoring changes in the area of the screen at the pixel level of the screenshots over a certain period of time.

37. The method of claim 36, further comprising:
determining changes in the area of the screen if pixels of the screenshots within the area change more than a predetermined threshold over the certain period of time.

38. The method of claim 27, further comprising:
detecting content that although is constantly changing, but should still be characterized as non-video content.

39. The method of claim 27, further comprising:
detecting the video content being rendered on the screen based on a combination of identifying video-oriented application window and monitoring changes of content rendered on the screen.

40. The method of claim 27, further comprising:
capturing the plurality of screenshots of the video content at a higher frequency than the static engine captures the plurality of screenshots of the non-video content.

41. The method of claim 27, further comprising:
delaying for several frames after the video content starts before starting to capture the video content in order to confirm that the video content is indeed being actively rendered on the screen.

42. The method of claim 27, further comprising:
performing high frame rate but low quality/fidelity per individual screenshot compression on the screenshots of the video content.

43. The method of claim 27, further comprising:
performing low frame rate but high quality/fidelity per individual screenshot compression on the screenshots of the non-video content.

44. The method of claim 27, further comprising:
performing multiple non video compressions each on the screenshots of a specific type of non-video content.

45. The method of claim 27, further comprising:
packaging the compressed screenshots of the video and/or the non-video content of the screen in a format for transmission over a communication network.

46. A non-transitory machine readable medium having instructions stored thereon that when executed cause a machine to:
detect and separate video content being rendered on a screen associated with a hosting device from a non-video content of the screen by performing automatic video detection to identify the video content and the non-video content on the screen, wherein the video content comprises dynamic content that is being played back on the screen of the hosting device and changes over time at regular intervals, the automatic video detection comprising: identifying at least one paused video content item, treating the at least one paused video content item as non-video content, identifying at least one content item that is changing at a rate of change associated with the video content but is non-video content, and treating the at least one content item that is changing at the rate of change associated with the video content as non-video content;
capture, at a video frame rate, a plurality of screenshots of the video content;
perform video compression on each of the plurality of screenshots of the video content;
capture, at a non-video frame rate, a plurality of screenshots of the non-video content, wherein the video frame rate exceeds the non-video frame rate; and
perform non-video compression on each of the plurality of screenshots of the non-video content, wherein at least one of the video frame rate or the non-video frame rate comprises an irregular frame rate, and wherein the irregular frame rate is determined based on key presses or mouse movements.

47. The non-transitory machine-readable medium of claim 46, wherein at least one of the video frame rate or the non-video frame rate comprises a fixed frame rate.

* * * * *